United States Patent
Basso et al.

(10) Patent No.: US 7,304,991 B2
(45) Date of Patent: Dec. 4, 2007

(54) MINIMIZING MEMORY ACCESSES FOR A NETWORK IMPLEMENTING DIFFERENTIAL SERVICES OVER MULTI-PROTOCOL LABEL SWITCHING

(75) Inventors: Claude Basso, Raleigh, NC (US); Francis Arts, Arendonk (BE); Brahmanand Kumar Gorti, Cary, NC (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 10/174,390

(22) Filed: Jun. 18, 2002

(65) Prior Publication Data

US 2003/0231640 A1 Dec. 18, 2003

(51) Int. Cl.
H04L 12/28 (2006.01)
(52) U.S. Cl. ............... 370/392; 370/400; 370/412; 370/466
(58) Field of Classification Search ............. None
See application file for complete search history.

(56) References Cited

U.S. PATENT DOCUMENTS

| | | | | |
|---|---|---|---|---|
| 6,075,798 | A | 6/2000 | Lyons et al. ............... | 370/474 |
| 6,094,437 | A | 7/2000 | Loehndorf, Jr. et al. .... | 370/420 |
| 6,256,309 | B1 | 7/2001 | Daley et al. ............... | 370/395 |
| 6,272,131 | B1 | 8/2001 | Ofek ........................ | 370/389 |
| 6,950,398 | B2 * | 9/2005 | Guo et al. ................. | 370/235 |
| 2002/0004843 | A1 * | 1/2002 | Andersson et al. ......... | 709/238 |
| 2002/0093954 | A1 * | 7/2002 | Weil et al. ................. | 370/389 |
| 2002/0122432 | A1 * | 9/2002 | Chaskar .................... | 370/466 |
| 2003/0002443 | A1 | 1/2003 | Basso et al. | |
| 2003/0152084 | A1 * | 8/2003 | Lee et al. ............. | 370/395.21 |

(Continued)

FOREIGN PATENT DOCUMENTS

EP 0989711 A1 3/2000

(Continued)

OTHER PUBLICATIONS

Faucheur et al., "RFC 3270: MPLS Support of Differentiated Services", May 2002, pp. 1-3.*

(Continued)

*Primary Examiner*—Chau Nguyen
*Assistant Examiner*—Jung Park
(74) *Attorney, Agent, or Firm*—Robert A. Voight, Jr.; Winstead PC

(57) ABSTRACT

A method, system and computer program product for translating a type of service field of one protocol into multiple protocols. An ingress router in a DIFFerentiated SERVices network (Diffserv over MPLS network) may determine a type of quality of service, e.g., forward IP packet using best effort. A value referred to as a Per Hope Behavior (PHB) value may be generated based on the identified type of quality of service. The PHB value may be used to index into a table comprising a row of entries with different quality of service values, e.g., DSCP value, EXP value, corresponding to a particular PHB value. Consequently, the PHB value may be used to perform a single memory access to determine the quality of service values for a plurality of protocols where the quality of service values corresponds to the identified type of quality of service.

27 Claims, 3 Drawing Sheets

U.S. PATENT DOCUMENTS

2003/0185217 A1* 10/2003 Ganti et al. .............. 370/395.5

FOREIGN PATENT DOCUMENTS

| EP | 1058424 A2 | 12/2000 |
| EP | 1091528 | 4/2001 |
| WO | WO0103383 A1 | 1/2001 |
| WO | 02/06968 | 1/2002 |

OTHER PUBLICATIONS

Krasnodembski et al, "End-to-end QoS provisioning across heterogeneous domains", Jun. 26, 2000, pp. 333-341, Proceedings of the IEEE Conference 2000 on High Performance Switching and Routing; ISBN: 0-7803-5884-8.

Hunt, "A review of quality of service mechanisms in IP-based networks—integrated and differentiated services, multi-layer switching, MPLS and traffic engineering", Jan. 1, 2002 pp. 100-108, Computer Communications, Elsevier Science Publishers BV, Amsterdam, NL, vol. 25. No. 1.

European Search Report dated Nov. 6, 2003.

M. Guizani et al. "Differentiated Services Support Using ATM GFR Service," *Parallel and Distributed Computing and Systems, IASTED*, vol. 11, Nov. 2000, pp. 455-460.

Tomohiro Ishihara et al. "Diffserv-Based QoS over ATM Access Networks," *IEICE Trans. Commun.*, vol. E84-B, No. 6, Jun. 2001, pp. 1498-1503.

"Distributed method for network bandwidth allocation," *IBM Research Disclosure*, Dec. 2000, pp. 2239.

Jun Tanaka et al. "QoS Interworking for Diffserv over ATM Access Networks," *IEEE*, 2000, pp. 1560-1564.

Jeffrey P. Hansen et al. "Probabilistic Bandwidth Reservation by Resource Priority Multiplexing," *IEEE*, 2001, pp. 171-178.

* cited by examiner

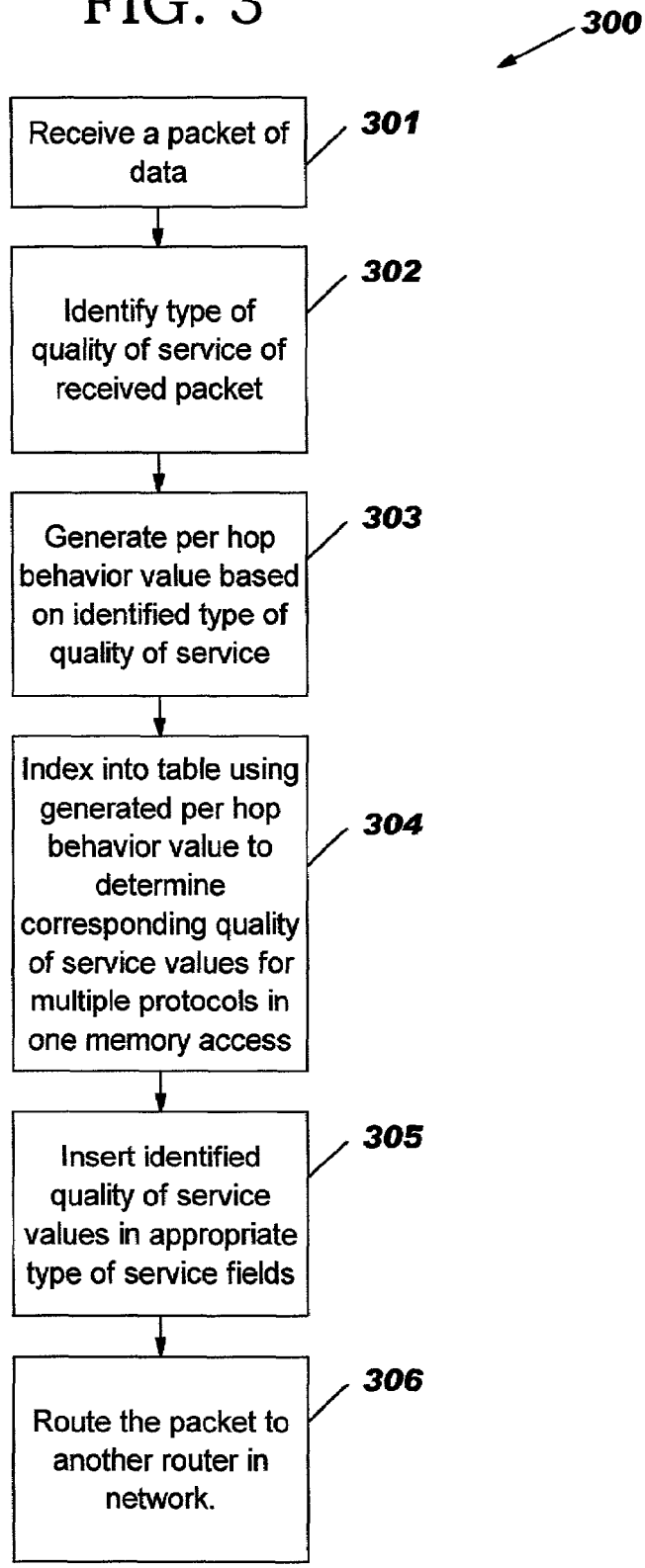

MINIMIZING MEMORY ACCESSES FOR A NETWORK IMPLEMENTING DIFFERENTIAL SERVICES OVER MULTI-PROTOCOL LABEL SWITCHING

TECHNICAL FIELD

The present invention relates to the field of computerized distribution information systems, and more particularly to minimizing memory accesses for a network implementing differentiated services over multi-protocol label switching.

BACKGROUND INFORMATION

The development of computerized distribution information systems, such as the Internet, allows users to link with servers and networks, and thus retrieve vast amounts of electronic information that was previously unavailable using conventional electronic media.

The Internet is based upon a suite of communication protocols known as the Transmission Control Protocol/Internet Protocol (TCP/IP) transmission protocol. A network that uses TCP/IP may be referred to as an Internet Protocol (IP) network. In TCP/IP, the standard describes how an Internet-connected computer should break data down into packets for transmission across the network, and how those packets should be addressed so that they arrive at their destination. IP is the connectionless part of the TCP/IP protocol. The TCP specifies how two Internet computers can establish a reliable data link by means of handshaking.

A major drawback of the Internet is the fact that the data transfer rate, commonly referred to as the "quality of service," cannot be assured. That is, IP-based networks cannot assure that packets of data, e.g., real-time data, will arrive at the same time. For example, data such as real-time voice and video, as well as time-sensitive data communications, may be delayed because transmissions are broken into packets that can travel different routes and arrive at different times. Thus, quality of service may refer to the ability to provide different traffic streams with different levels of service, e.g., real-time data with a higher priority of service than non-real-time data. A means of modifying the IP-based networks to provide different traffic streams with different levels of service in terms of metrics such as available bandwidth, delay and packet loss, may be achieved by implementing the following protocols.

A high-level standard or protocol for adding quality of service to IP networks may be referred to as DIFFerentiated SERVices (Diffserv). In a network implementing the Diffserv protocol, different traffic streams requiring different quality of service, i.e., different levels of service, may be classified at the edge of the network by a network device, e.g., router, using what is commonly referred to as a Diffserv Code Point (DSCP) field located in the type of service field in the header of the received IP packet. Typically, the DSCP field may comprise different values where each value may correspond to different types of treatment, e.g., forward IP packet using best effort, forward IP packet using assured forwarding, forward IP packet using expedited forwarding.

Another protocol for adding quality of service to IP networks may be referred to as Multi-Protocol Label Switching (MPLS). MPLS may refer to an underlying protocol that may be used in conjunction with a high-level protocol such as Diffserv. MPLS may use fixed-length values that are commonly called labels or tags. The labels may contain forwarding information which may be attached to IP packets by a router that sits at the edge of the network known as a Label Edge Router (LER). The attached forwarding information may commonly be referred to as an MPLS shim header. Typically, the MPLS shim header is prepended to the IP packet header. The MPLS shim header may comprise a type of service field commonly referred to as the "EXP" field which may store the quality of service, i.e., the type of service, to be performed on the received IP packet. The routers within the core of the network, known as Label Switch Routers (LSR's), examine the label more quickly than if they had to look up destination addresses in a routing table.

By a network implementing Diffserv in conjunction with MPLS (commonly referred to as "Diffserv over MPLS"), end-to-end quality of service may be achieved. That is, by a network implementing Diffserv over MPLS, real-time data such as real-time voice and video, may be assured of leaving the source and arriving at the destination in a continuous manner. Typically, in a network implementing Diffserv over MPLS, part of the network may simply support Diffserv while another part of the network may simply support MPLS. That is, a portion of the Diffserv over MPLS network may comprise connections between routers that simply support Diffserv (referred to as "Diffserv connections") as well as connections between routers that simply support MPLS (referred to as "MPLS connections").

A network implementing Diffserv over MPLS may have to perform multiple memory accesses on a received IP packet. For example, a router at the edge of the network may receive an IP packet from an external network. The router may perform a memory access on its ingress side by performing a table look-up to determine the type of quality of service. Different networks may use different definitions for the same quality of service despite the fact that the networks use the same protocol, e.g., Diffserv. For example, an IP packet from a Diffserv network may define forwarding using best efforts with a value of 000001 in the DSCP field. Another Diffserv network may define forwarding using best efforts with a value of 000111 in the DSCP field. In another example, an IP packet from a MPLS network may define forwarding using best efforts with a value of 001 in the EXP field. Another MPLS network may define forwarding using best efforts with a value of 111 in the EXP field. Hence, a translation may occur at the ingress side of the edge router to determine the type of quality of service to be performed on the received IP packet.

In the Diffserv over MPLS network, the edge router may be coupled to another router using either a connection that supports MPLS or a connection that supports Diffserv. Hence, depending on whether the IP packet is to be routed to a router, e.g., LSR, router at the other edge of the Diffserv over MPLS network, over a Diffserv connection or an MPLS connection, a different memory mapping must be performed. That is, a separate mapping table for mapping the quality of service to the appropriate DSCP value for the Diffserv connection or to the appropriate EXP value for the MPLS connection must be maintained. For example, a value in the DSCP field may have to be mapped to a different DSCP value for the same quality of service. A value in the DSCP field may have to be mapped to a corresponding EXP value if the IP packet is being transmitted from a network that simply supports Diffserv to an MPLS connection in the Diffserv over MPLS network. A value in the EXP field may have to be mapped to a different EXP value for the same quality of service. A value in the EXP field may have to be mapped to a corresponding DSCP value if the IP packet is being transmitted from a network that simply supports MPLS to a Diffserv connection in the Diffserv over MPLS network.

If a single memory table may be used for mapping the quality of service to the appropriate DSCP value for the Diffserv connection or to the appropriate EXP value for the MPLS connection, then the number of memory accesses may be reduced. By reducing memory accesses, packet forwarding performance may be improved.

It would therefore be desirable to provide DSCP remapping and EXP remapping using a single memory table thereby being able to reduce the number of memory accesses and consequently improve forwarding performance.

SUMMARY

The problems outlined above may at least in part be solved in some embodiments by generating a value, referred to as a Per Hop Behavior (PHB) value, associated with the identified quality of service, e.g., forward IP packet using best effort, forward IP packet using assured forwarding, forward IP packet using expedited forwarding, in a received packet of data. The PHB value may be used to index into a table comprising a row of entries with different quality of service values, e.g., DSCP value, EXP value, corresponding to a particular PHB value. Consequently, the PHB value may be used to perform a single table-lookup to determine the quality of service values, e.g., DSCP value, EXP value, for a plurality of protocols, e.g., Diffserv, MPLS, where the quality of service values corresponds to the identified type of quality of service. That is, the PHB value may be used to perform a single memory access to determine the quality of service values, e.g., DSCP value, EXP value, for a plurality of protocols, e.g., Diffserv, MPLS, where the quality of service values corresponds to the identified type of quality of service.

In one embodiment of the present invention, a method for translating a type of service field of one protocol into multiple protocols may comprise the step of an ingress router in a Diffserv over MPLS network receiving a packet, e.g., Internet Protocol (IP) packet, from an external network. The ingress router may identify the type of quality of service, e.g., forward IP packet using assured forwarding, forward IP packet using expedited forwarding, in the received packet. In one embodiment, the ingress router may identify the type of quality of service by reading the type of service field in the received packet.

The ingress router may generate a value used to index into a table to determine the quality of service values for multiple protocols, e.g., Diffserv, MPLS, corresponding to the type of quality of service identified. The generated value may refer to an internal Per Hop Behavior (PHB) value that indicates the type of service, e.g., forward IP packet using best effort, forward IP packet using assured forwarding, forward IP packet using expedited forwarding, to be treated on the received packet within the Diffserv over MPLS network. In one embodiment, the PHB value may be generated by performing a table look-up, i.e., indexing into a table, where the table may comprise a plurality of PHB values associated with particular types of quality of services.

The ingress router may use the PHB value to index into a table to determine the corresponding quality of service values, e.g., DSCP value, EXP value, for a plurality of protocols, e.g., Diffserv, MPLS, in one memory access. In one embodiment, the table may comprise a row of entries with different quality of service values, e.g., DSCP value, EXP value, corresponding to a particular PHB value, i.e., corresponding to a particular type of service.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 3 is a flowchart of a method for translating a type of service of field of one protocol into multiple protocols in accordance with the present invention.

DETAILED DESCRIPTION

It is noted that even though the description of the present invention describes translating a type of service field from one protocol to the protocols Diffserv and MPLS that the principles of the present invention may be used to translate the type of service field from any type of protocol to any type of multiple protocols. It is further noted that embodiments translating the type of service field from any type of protocol to any type of multiple protocols would fall within the scope of the present invention.

Figure 1:
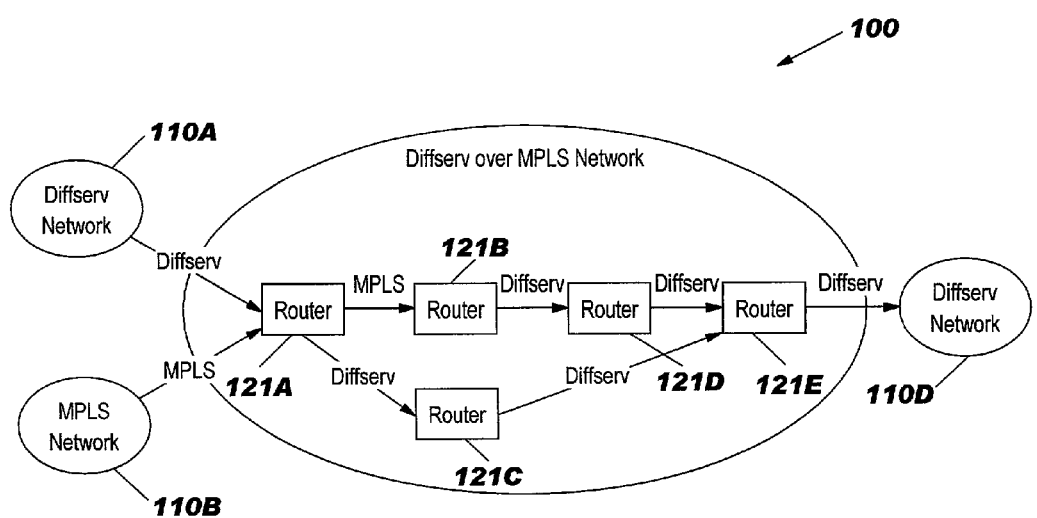
FIG. 1 illustrates a network system configured in accordance with the present invention.

FIG. 1—Network System

FIG. 1 illustrates an embodiment of a network system 100 in accordance with the present invention. Network system 100 may comprise one or more different types of networks 110A-D interconnected with one another to form at least in part what is commonly referred to as the Internet. Networks 110A-D may collectively or individually be referred to as networks 110 or network 110, respectively. Each network 110 may be an Internet Protocol (IP) based network. Furthermore, each network 110 may be configured to add quality of service to the IP based network. Quality of service may refer to the ability to provide different traffic streams with different levels of service, e.g., real-time data with a higher priority than non-real-time data. A network may add quality of service to the IP based network such as by using a high level protocol commonly referred to as DIFFerentiated SERVices (Diffserv) as illustrated by networks 110A and 110D. Furthermore, a network may add quality of service to the IP based network such as by using a protocol commonly referred to as a Multi-Protocol Label Switching (MPLS) as illustrated by network 110B. MPLS may refer to an underlying protocol that may be used in conjunction with a higher level protocol such as Diffserv. A network, such as network 110C, that implements Diffserv in conjunction with MPLS (commonly referred to as "Diffserv over MPLS"), may achieve end-to-end quality of service. That is, by network 110C implementing Diffserv over MPLS, real-time data such as real-time voice and video, may be assured of entering network 110C and leaving network 110C in a continuous manner. It is noted that network system 100 may comprise any number of networks 110 each implementing different types of protocols than illustrated. It is further noted that network system 100 is not to be construed in a limiting manner.

Referring to FIG. 1, network 110C implementing Diffserv over MPLS may comprise one or more routers 121A-E configured to forward packets of data. Routers 121A-E may collectively or individually be referred to as routers 121 or router 121, respectively. A more detailed description of router 121 is provided below in conjunction with FIG. 2. It is noted that network 110C may comprise any number of routers 121 and that FIG. 1 is illustrative. As stated in the Background Information section, typically in a network implementing Diffserv over MPLS, part of the network may simply support Diffserv while another part of the network may simply support MPLS. That is, a portion of the Diffserv over MPLS network may comprise connections between routers that simply support Diffserv (referred to as "Diffserv connections") as well as connections between routers that simply support MPLS (referred to as "MPLS connections"). For example, FIG. 1 illustrates Diffserv connections between routers 121A and 121C, between routers 121B and 121D, between routers 121D and 121E, between routers 121C and 121E and between router 121E and external network 110D. FIG. 1 further illustrates an MPLS connection between routers 121A and 121B.

The type of quality of service, i.e., the type of service, to be performed on an IP packet in a network implementing the Diffserv protocol may be determined by the value in a Diffserv Code Point (DSCP) field located in the type of service field in the header of the IP packet. The type of quality of service to be performed on an IP packet in a network implementing the MPLS protocol may be determined by the value in the type of service field, commonly referred to as the EXP field, located in the MPLS shim header prepended to the IP packet header. As stated in the Background Information section, the values in these type of service fields for Diffserv and MPLS may have to be mapped to different values in order to ensure end-to-end quality of service in a network implementing Diffserv over MPLS such as network 130. However, the mapping of a type of service field value from one protocol to another protocol may each involve a separate memory access to a separate table. That is, multiple memory tables are required for mapping the quality of service to the appropriate DSCP value for the Diffserv connection or to the appropriate EXP value for the MPLS connection. If, however, a single table were used for mapping the quality of service to the appropriate DSCP value for the Diffserv connection or to the appropriate EXP value for the MPLS connection, then the number of memory accesses may be reduced. By reducing memory accesses, packet forwarding performance may be improved. Memory accesses may be reduced by using a single table for translating or mapping the quality of service from one protocol to multiple protocols, e.g., Diffserv, MPLS, to ensure end-to-end quality of service in a network 110, e.g., network 130, implementing multiple protocols, e.g., Diffserv over MPLS, as explained below.

Referring to FIG. 1, the ingress router 121, e.g., router 121A, in network 130 may receive a packet from an external network 110, e.g., network 110A, network 110B. The ingress router 121, e.g., router 121A, may then identify the type of quality of service in the received packet. In one embodiment, the ingress router 121, e.g., router 121A, may identify the type of quality of service by reading the type of service field. For example, if the packet was transmitted from network 110, e.g., network 110A, implementing Diffserv, then the ingress router 121, e.g., router 121A, may be configured to read the DSCP field located in the type of service field in the header of the IP packet. If the packet was transmitted from network 110, e.g., network 110B, implementing MPLS, then the ingress router 121, e.g., router 121A, may be configured to read the EXP field (type of service field) located in the MPLS shim header prepended to the IP packet header.

Upon identifying the type of quality of service, e.g., forward IP packet using best effort, forward IP packet using assured forwarding, forward IP packet using expedited forwarding, the ingress router 121, e.g., router 121A, may generate a value used to index into a table to determine the quality of service values for multiple protocols, e.g., Diffserv, MPLS, corresponding to the identified type of quality of service as explained further below. The generated value may refer to an internal Per Hop Behavior (PHB) value that indicates the type of service, e.g., forward IP packet using best effort, forward IP packet using assured forwarding, forward IP packet using expedited forwarding, to be treated on the received packet within network 130. In one embodiment, the PHB value may be generated by performing a table look-up, i.e., indexing into a table, where the table may comprise a plurality of PHB values associated with particular types of quality of services. For example, if the ingress router 121, e.g., router 121A, determined that the received packet is to be forwarded using best efforts, then the ingress router 121, e.g., router 121A, may index into a table to determine the PHB value associated with forwarding using best effort. In one embodiment, the table may be stored in a non-volatile storage unit, e.g., non-volatile memory, disk unit, in the ingress router 121, e.g., router 121 A, as described in greater detail further below in conjunction with FIG. 2.

Upon generating the PHB value, the PHB value may be used to index into a table to determine the corresponding quality of service values, e.g., DSCP value, EXP value, for a plurality of protocols, e.g., Diffserv, MPLS, in one memory access. In one embodiment, the table may comprise a row of entries with different quality of service values, e.g., DSCP value, EXP value, corresponding to a particular PHB value, i.e., corresponding to a particular type of service. For example, if the received packet from a Diffserv network 110, e.g., network 110A, has been encoded with a quality of service value in the DSCP field, e.g., 000001, that indicates to forward using best efforts, then the ingress router 121, e.g., router 121A, may be configured to determine the PHB value corresponding to forwarding using best efforts as discussed above. The ingress router 121, e.g., router 121A, may then be configured to index into a table using the PHB value to determine the corresponding quality of service values to be inserted in the DSCP field, e.g., 00011, and in the EXP field, e.g., 000. These quality of service values correspond to the type of quality of service of forwarding using best efforts. In another example, if the received packet from a MPLS network 110, e.g., network 110B, has been encoded with a quality of service value in the EXP field, e.g., 001, that indicates to forward using best efforts, then the ingress router 121, e.g., router 121A, may be configured to determine the PHB value corresponding to forwarding using best efforts as discussed above. The ingress router 121, e.g., router 121A, may then be configured to index into a table using the PHB value to determine the corresponding quality of service values to be inserted in the DSCP field, e.g., 00011, and in the EXP field, e.g., 000. These quality of service values correspond to the type of quality of service of forwarding using best efforts. As stated in the Background Information section, different networks may use different definitions for the same quality of service despite the fact that the networks use the same protocol, e.g., Diffserv, MPLS. Hence, the value in the type of service field, e.g., DSCP field, EXP field, may be encoded with a different value for the same type of service. It is noted that different networks may also use the same definitions for the same quality of service that use the same protocol, e.g., Diffserv, MPLS. Hence, the value in the type of service field, e.g., DSCP field, EXP field, may be encoded with the same value for the same type of service.

Upon determining the quality of service values for a plurality of protocols, e.g., Diffserv, MPLS, in one memory access, the packet may be routed to the appropriate router 121, e.g., router 121B, router 121C, in network 130, over multiple types of connections, e.g., Diffserv connection, MPLS connection. For example, the ingress router 121, e.g., router 121A, may be configured to route the received packet to router 121B over an MPLS connection using the appropriate EXP value. Router 121A may also be configured to route the received packet to router 121C over a Diffserv connection using the appropriate DSCP value. The ingress router 121, e.g., router 121A, may be able to route the received packet to the appropriate router 121, e.g., router 121B, router 121C, in network 130, over multiple types of connections, e.g., Diffserv connection, MPLS connection, by only storing a single table on its egress side. The single table may be used by router 121A to map an internal PHB value to a plurality of quality of service values for a plurality of protocols, e.g., Diffserv, MPLS, for the identified type of quality of service, e.g., forwarding using best efforts. That is, the ingress router 121, e.g., router 121A, may be able to route the received packet to the appropriate router 121, e.g., router 121B, router 121C, in network 130, over multiple types of connections, e.g., Diffserv connection, MPLS connection, without storing a separate memory mapping table for each type of protocol, e.g., Diffserv, MPLS.

It is noted that the internal routers 121, e.g., router 121B, router 121C, router 121D, in network 130 do not have to perform the table look-up procedure described above. The appropriate quality of service values for particular protocols, e.g., Diffserv, MPLS, are already stored in their appropriate type of service fields, e.g., DSCP field, EXP field. It is further noted that the egress router 121, e.g., router 121E, may be similarly configured as ingress router 121, e.g., router 121A. The egress router 121, e.g., router 121E, may identify a type of quality of service in a received packet of data. The egress router 121, e.g., router 121E, may then generate an internal PHB value based on the identified type of quality of service as described above. The egress router 121, e.g., router 121E, may perform a single table look-up using the generated PHB value as described above to translate or map one or more of the quality of service values in one or more protocols, e.g., Diffserv, MPLS, to one or more other quality of service values for the adjacent network 110, e.g., network 110D, whose mappings may be different. Hence, the egress router 121, e.g., router 121E, may be similarly configured as the ingress router 121, e.g., router 121A, in storing only a single table on its egress side instead of multiple tables corresponding to multiple protocols.

Figure 2:
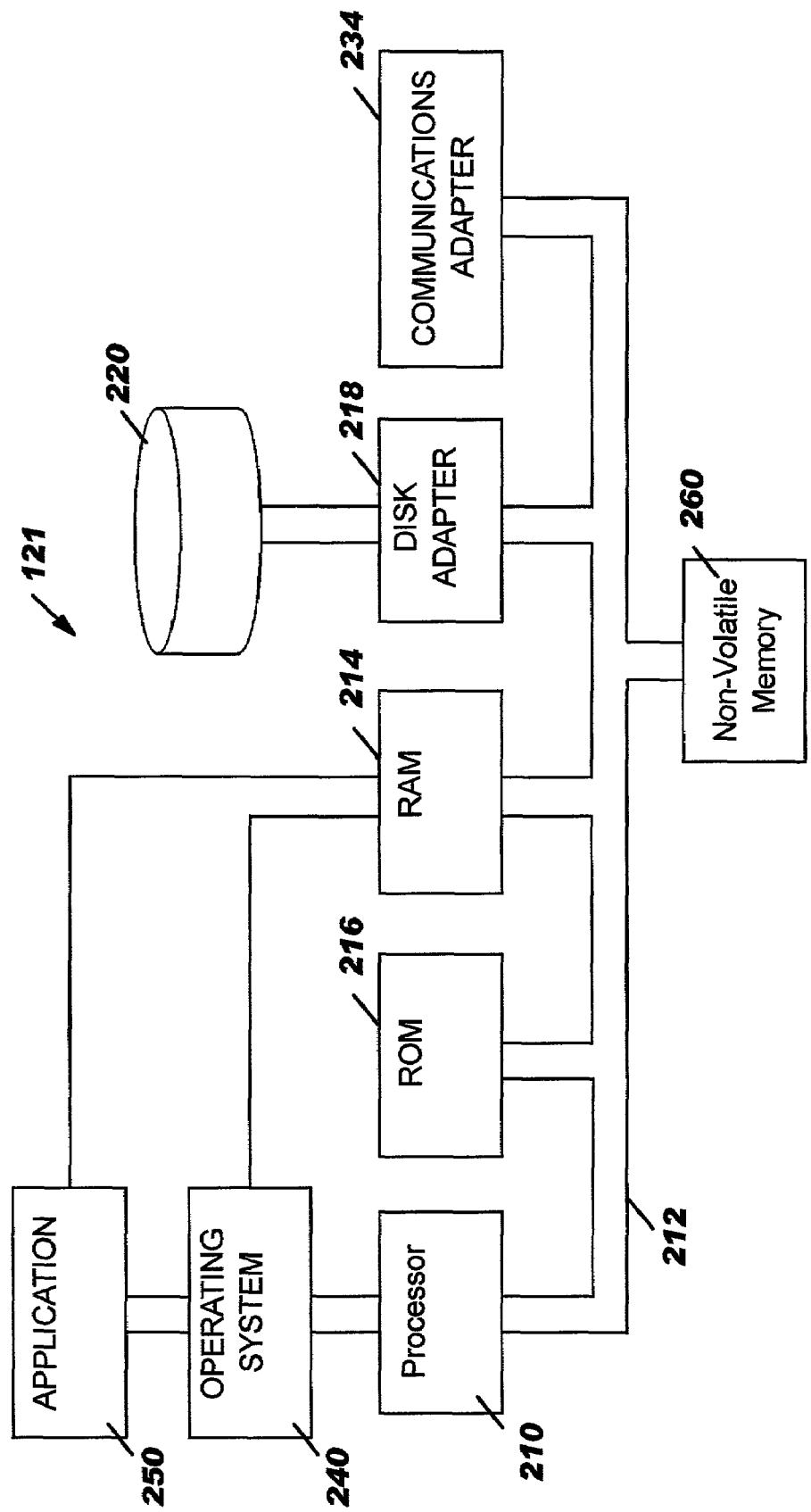
FIG. 2 illustrates an embodiment of a router in the network system configured in accordance with the present invention.

FIG. 2—Hardware Configuration of Router

FIG. 2 illustrates an embodiment of the present invention of router 121 (FIG. 1). Referring to FIG. 2, router 121 may comprise a processor 210 coupled to various other components by system bus 212. An operating system 240, may run on processor 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Application 250 in the edge routers 121A, 121E (FIG. 1) in network 130 (FIG. 1), may include, for example, a program for translating a type of service field of one protocol into multiple protocols as described in FIG. 3. Read-Only Memory (ROM) 216 may be coupled to system bus 212 and include a basic input/output system ("BIOS") that controls certain basic functions of router 121. Random access memory (RAM) 214, disk adapter 218 and communications adapter 234 may also be coupled to system bus 212. It should be noted that software components including operating system 240 and application 250 may be loaded into RAM 214 which may be the router's 121 main memory for execution. Disk adapter 218 may be a small computer system interface ("SCSI") adapter that communicates with a disk unit 220, e.g., disk drive. It is noted that the program of the present invention that translates a type of service field of one protocol into multiple protocols as described in FIG. 3, may reside in disk unit 220 or in application 250. It is further noted that disk unit 220 for the edge routers 121A, 121E, in network 130 may be configured to store a table configured to store PHB values as discussed above. Furthermore, disk unit 220 for the edge routers 121A, 121E, in network 130 may be configured to store a table configured to store a plurality of quality of service values, e.g., DSCP value, EXP value, for a plurality of protocols, e.g., Diffserv, MPLS, associated with particular PHB values as discussed above.

Referring to FIG. 2, communications adapter 234 may interconnect bus 212 with various connections, e.g., Diffserv connection, MPLS connection, in network 130 enabling router 121 to communicate with other routers 121 or other networks 110 (FIG. 1), e.g., networks 110A, 110B, 110D. Router 121 may further comprise a non-volatile memory 260 coupled to bus 212. Non-volatile memory 260 for the edge routers 121A, 121E, in network 130 may be configured to store a table configured to store PHB values as discussed above. Furthermore, non-volatile memory 260 for the edge routers 121A, 121E, in network 130 may be configured to store a table configured to store a plurality of quality of service values, e.g., DSCP value, EXP value, for a plurality of protocols, e.g., Diffserv, MPLS, associated with particular PHB values as discussed above.

Implementations of the invention include implementations as a computer system programmed to execute the method or methods described herein, and as a computer program product. According to the computer system implementations, sets of instructions for executing the method or methods are resident in RAM 214 of one or more computer systems configured generally as described above. Until required by router 121, the set of instructions may be stored as a computer program product in another computer memory, for example, in disk drive 220 (which may include a removable memory such as an optical disk or floppy disk for eventual use in disk drive 220). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

FIG. 3—Method for Translating a Type of Service Field of One Protocol into Multiple Protocols FIG. 3 is a flowchart of one embodiment of the present invention of a method 300 for translating a type of service field of one protocol into multiple protocols. As stated in the Background Information section, the values in these type of service fields for Diffserv and MPLS may have to be mapped to different values in order to ensure end-to-end quality of service in a network implementing Diffserv over MPLS. However, the mapping of a type of service field value from one protocol to another protocol may each involve a separate memory access to a separate table. That is, multiple memory tables are required for mapping the quality of service to the appropriate DSCP value for the Diffserv connection or to the appropriate EXP value for the MPLS connection. If, however, a single table were used for mapping the quality of service to the appropriate DSCP value for the Diffserv connection or to the appropriate EXP value for the MPLS connection, then the number of memory accesses may be reduced. By reducing memory accesses, packet forwarding performance may be improved. Method 300 is a method for translating or mapping the quality of service from one protocol to multiple protocols, e.g., Diffserv, MPLS, to ensure end-to-end quality of service in a network by using a single table.

Referring to FIG. 3, in conjunction with FIG. 1, in step 301, an ingress router 121, e.g., router 121A, in network 130 may receive a packet, e.g., Internet Protocol (IP) packet, from an external network 110, e.g., network 110A, network 110B. In step 302, the ingress router 121, e.g., router 121A, may identify the type of quality of service, e.g., forward IP packet using assured forwarding, forward IP packet using expedited forwarding, in the received packet. In one embodiment, the ingress router 121, e.g., router 121A, may identify the type of quality of service by reading the type of service field.

In step 303, the ingress router 121, e.g., router 121A, may generate a value used to index into a table to determine the quality of service values for multiple protocols, e.g., Diffserv, MPLS, corresponding to the type of quality of service identified in step 302. The generated value may refer to an internal Per Hop Behavior (PHB) value that indicates the type of service, e.g., forward IP packet using best effort, forward IP packet using assured forwarding, forward IP packet using expedited forwarding, to be treated on the received packet within network 130. In one embodiment, the PHB value may be generated by performing a table look-up, i.e., indexing into a table, where the table may comprise a plurality of PHB values associated with particular types of quality of services. For example, if the ingress router 121, e.g., router 121A, determined that the received packet is to be forwarded using expedited forwarding, then the ingress router 121, e.g., router 121A, may index into a table to determine the PHB value associated with forwarding using expedited forwarding. In one embodiment, the table configured to store PHB values may be stored in a non-volatile storage unit, e.g., non-volatile memory 260 (FIG. 2), disk unit 220 (FIG. 2), in the ingress router 121, e.g., router 121A.

In step 304, the ingress router 121, e.g., router 121A, may use the PHB value to index into a table to determine the corresponding quality of service values, e.g., DSCP value, EXP value, for a plurality of protocols, e.g., Diffserv, MPLS, in one memory access. In one embodiment, the table may comprise a row of entries with different quality of service values, e.g., DSCP value, EXP value, corresponding to a particular PHB value, i.e., corresponding to a particular type of service. In one embodiment, the table configured to store a plurality of quality of service values, e.g., DSCP value, EXP value, for a plurality of protocols, e.g., Diffserv, MPLS, may be stored in a non-volatile storage unit, e.g., non-volatile memory 260 (FIG. 2), disk unit 220 (FIG. 2), in the ingress router 121, e.g., router 121A. Hence, the ingress router 121, e.g., router 121A, may only store a single table on its egress side instead of multiple tables corresponding to multiple protocols.

In step 305, the quality of service values, e.g., DSCP value, EXP value, identified in step 304 may be inserted in their respective type of service fields, e.g., DSCP field, EXP field, in the received packet by the ingress router 121, e.g., router 121A. Furthermore, the PHB value may be stored within the packet header or MPLS shim header by the ingress router 121, e.g., router 121A.

In step 306, the packet including the PHB value may be routed to another router 121, e.g., router 121B, router 121C, in network 130.

It is noted that the egress router 121, e.g., router 121E, in network 130 may perform at least a portion of steps 301-306 as described below. The egress router 121, e.g., router 121E, may identify a type of quality of service in a received packet of data. The egress router 121, e.g., router 121E, may then generate an internal PHB value based on the identified type of quality of service as described above. The egress router 121, e.g., router 121E, may use the internal PHB value to index into a table to translate or map one or more of the quality of service values in one or more protocols, e.g., Diffserv, MPLS, to one or more other quality of service values for the adjacent network 110, e.g., network 110D, whose mappings may be different. Hence, the egress router 121, e.g., router 121E, may be similarly configured as the ingress router 121, e.g., router 121A, in storing only a single table on its egress side instead of multiple tables corresponding to multiple protocols. Upon indexing into the table to translate or map one or more of the quality of service values in one or more protocols, e.g., Diffserv, MPLS, the translated quality of service value(s), e.g., DSCP value, EXP value, may be inserted in their respective type of service field(s), e.g., DSCP field, EXP field, in the received packet by the egress router 121, e.g., router 121E. The egress router 121, e.g., router 121E, may then route the received packet to an adjacent network 110, e.g., network 110D.

It is noted that method 300 may be executed in a different order presented and that the order presented in the discussion of FIG. 3 is illustrative. It is further noted that certain steps in FIG. 3 may be executed almost concurrently.

Although the system, computer program product and method are described in connection with several embodiments, it is not intended to be limited to the specific forms set forth herein; but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for translating a type of service field of one protocol into multiple protocols comprising the steps of:
   receiving a packet of data;
   identifying a type of quality of service in said received packet of data;
   generating a value based on said identified type of quality of service; and
   indexing into a first table using said generated value to determine a plurality of quality of service values corresponding to said identified type of quality of service, wherein each of said plurality of quality of service values is a value for a corresponding one of a plurality of protocols.

2. The method as recited in claim 1, wherein said type of quality of service is identified in a type of service field in said received packet of data.

3. The method as recited in claim 1, wherein said plurality of protocols includes at least one or more of the following: differentiated services, multi-protocol label switching.

4. The method as recited in claim 1, wherein said identified type of quality of service has a first value for a first protocol.

5. The method as recited in claim 4, wherein in response to indexing into said first table using said generated value, a second value for said first protocol and a third value for a second protocol is retrieved, wherein said second value and said third value corresponds to said type of quality of service identified.

6. The method as recited in claim 5, wherein said first protocol is at least one of the following: differentiated services, multi-protocol label switching.

7. The method as recited in claim 5, wherein said second protocol is at least one of the following: differentiated services, multi-protocol label switching.

8. The method as recited in claim 1, wherein said generated value is generated by indexing into a second table using said identified type of quality of service.

9. The method as recited in claim 1 further comprising the step of:
inserting said plurality of quality of service values corresponding to said identified type of quality of service in appropriate type of service fields in said received packet of data.

10. A computer program product embodied in a machine readable medium for translating a type of service field of one protocol into multiple protocols comprising the programming steps of:
receiving a packet of data;
identifying a type of quality of service in said received packet of data;
generating a value based on said identified type of quality of service; and
indexing into a first table using said generated value to determine a plurality of quality of service values corresponding to said identified type of quality of service, wherein each of said plurality of quality of service values is a value for a corresponding one of a plurality of protocols.

11. The computer program product as recited in claim 10, wherein said type of quality of service is identified in a type of service field in said received packet of data.

12. The computer program product as recited in claim 10, wherein said plurality of protocols includes at least one or more of the following: differentiated services, multi-protocol label switching.

13. The computer program product as recited in claim 10, wherein said identified type of quality of service has a first value for a first protocol.

14. The computer program product as recited in claim 13, wherein in response to indexing into said first table using said generated value, a second value for said first protocol and a third value for a second protocol is retrieved, wherein said second value and said third value corresponds to said type of quality of service identified.

15. The computer program product as recited in claim 14, wherein said first protocol is at least one of the following: differentiated services, multi-protocol label switching.

16. The computer program product as recited in claim 14, wherein said second protocol is at least one of the following: differentiated services, multi-protocol label switching.

17. The computer program product as recited in claim 10, wherein said generated value is generated by indexing into a second table using said identified type of quality of service.

18. The computer program product as recited in claim 10 further comprising the programming step of:
inserting said plurality of quality of service values corresponding to said identified type of quality of service in appropriate type of service fields in said received packet of data.

19. A system, comprising:
a memory unit operable for storing a computer program for translating a type of service field of one protocol into multiple protocols; and
a processor coupled to said memory unit, wherein said processor, responsive to said computer program, comprises:
circuitry operable for receiving a packet of data;
circuitry operable for identifying a type of quality of service in said received packet of data;
circuitry operable for generating a value based on said identified type of quality of service; and
circuitry operable for indexing into a first table using said generated value to determine a plurality of quality of service values corresponding to said identified type of quality of service, wherein each of said plurality of quality of service values is a value for a corresponding one of a plurality of protocols.

20. The system as recited in claim 19, wherein said type of quality of service is identified in a type of service field in said received packet of data.

21. The system as recited in claim 19, wherein said plurality of protocols includes at least one or more of the following: differentiated services, multi-protocol label switching.

22. The system as recited in claim 19, wherein said identified type of quality of service has a first value for a first protocol.

23. The system as recited in claim 22, wherein in response to indexing into said first table using said generated value, a second value for said first protocol and a third value for a second protocol is retrieved, wherein said second value and said third value corresponds to said type of quality of service identified.

24. The system as recited in claim 23, wherein said first protocol is at least one of the following: differentiated services, multi-protocol label switching.

25. The system as recited in claim 23, wherein said second protocol is at least one of the following: differentiated services, multi-protocol label switching.

26. The system as recited in claim 19, wherein said generated value is generated by indexing into a second table using said identified type of quality of service.

27. The system as recited in claim 19, wherein said processor further comprises:
circuitry operable for inserting said plurality of quality of service values corresponding to said identified type of quality of service in appropriate type of service fields in said received packet of data.

* * * * *